Oct. 28, 1941. F. M. WITTLINGER ET AL 2,260,593
METHOD OF MAKING WEAR RESISTANT SURFACES
Filed May 27, 1940
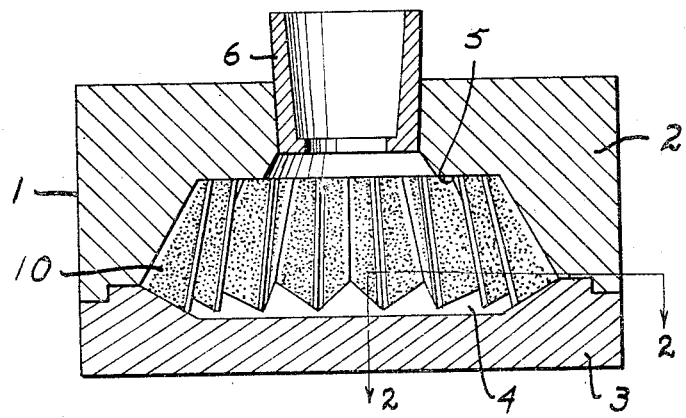
Fig. 1.
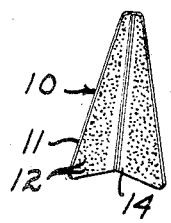
Fig. 3.
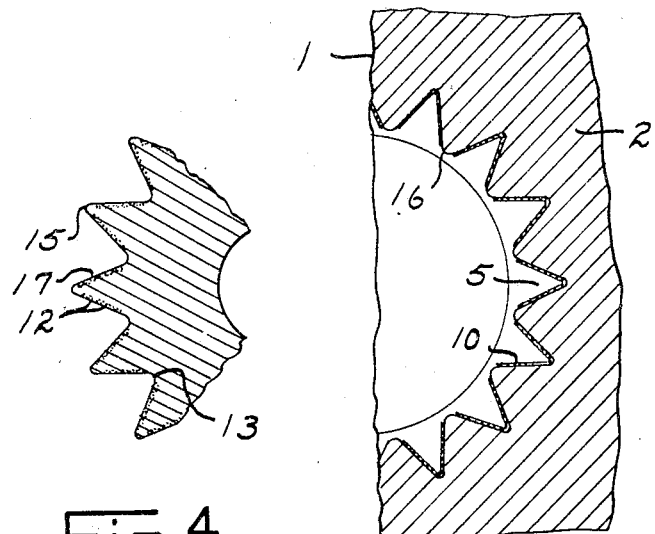
Fig. 4.
Fig. 2.
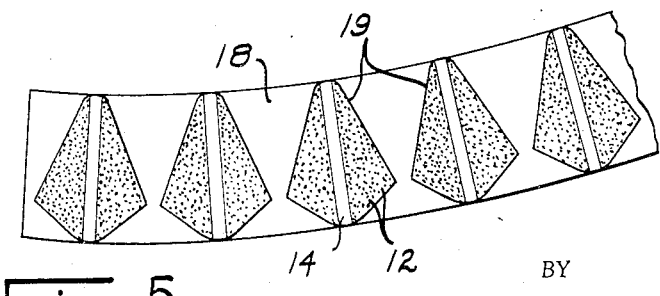
Fig. 5.
C. W. SHARTLE Jr.
F. M. WITTLINGER
INVENTORS.
BY Jesse R. Stone
Lester B Clark
ATTORNEYS Patented Oct. 28, 1941

2,260,593

UNITED STATES PATENT OFFICE 2,260,593

METHOD OF MAKING WEAR RESISTANT SURFACES

Frederick M. Wittlinger and Charles W. Shartle, Jr., Houston, Tex., assignors to Texas Electric Steel Casting Company, Houston, Tex., a corporation of Texas Application May 27, 1940, Serial No. 337,330

3 Claims. (Cl. 22—202)

This invention relates to an improved method of providing a cast body having abrasion resistant material incorporated in surfaces to be subjected to abrading action.

In the production of articles of which one or more surfaces are to be subjected to abrasive action and in particular various forms of cutting devices, it has been proposed to attach thereto, as by welding, particles of abrasion resistant materials such as the various carbides, tungsten carbide in particular. Such technique requires considerable labor after the article has been initially formed and the completed article is inferior in that certain unavoidable contamination of the metal is brought about, the hard particles are adversely affected by the welding operation, and the particles are not uniformly distributed nor fixed in place at uniform depth.

The primary object of the invention is to provide a simple and effective method of embodying abrasion resistant particles into the surface of an article to be subjected to abrasion action.

Another object is to provide a novel method for embodying particles of an abrasion resistant material in the surface of an article when such article is initially formed.

Another object is to provide a novel method of holding abrasion resistant particles closely adjacent the surface of a mold or pattern in which the article is to be cast so that the molten metal which is cast to form the article will surround such particles whereby they are effectively secured in place.

A further object is to provide a technique whereby hard particles are held in position until cast metal is effective in maintaining such position, the holding agent thereupon being consumed so that the molten metal completely surrounds the particles.

Still another object is to utilize such materials for holding particles in place in the mold or pattern that no contamination of the cast metal results.

A more specific object of the invention is to attach particles of hard material to a consumable backing which is placed on the surfaces of the mold against which an abrasion resistant surface is to be cast.

Still another object is to provide a novel technique whereby abrasion particles are embedded in the exact desired locations in a cast article.

A further object is to provide a novel insert for use in a mold to enable embodiment of abrasion resistant particles in the surface of an article cast in the mold.

With the foregoing objects as primary objects the invention is particularly directed to the steps of the method and to the article for use in producing a cast article having wear resistant surfaces as illustrated in the accompanying drawing in which:

Fig. 1 is a vertical sectional view thru a mold prepared for casting of an article in accordance with the invention;

Fig. 2 is a sectional view taken on line 2—2 in Fig. 1;

Fig. 3 is a perspective view of an insert such as may be used in the mold in Fig. 1;

Fig. 4 is a partial sectional view of a rotary cutting disc cast in accordance with the invention;

Fig. 5 is a plan view of an insert for use in positioning hard surfacing material in a plurality of areas.

The present invention is adaptable for use in producing any of various types of cast articles upon which a wear resistant surface is desired. The invention is illustrated in the drawing in connection with the fabrication of a cutter disc for roller discs, it being desired to have the cutting teeth of the disc extremely resistant to abrasion encountered when in use.

In Fig. 1 of the drawing there is shown a section thru a mold 1 prepared for the casting of a cutter disc. Such mold comprises the cope 2 and the drag 3 within which is formed a cavity 4 having side recesses 5 into which teeth are to be formed by metal cast into the mold thru the riser 6. While it is not essential to the practice of the invention it is desirable that the mold 1 be rotated during casting so that centrifugal force will be instrumental in creating a more dense metal in the peripheral portions of the cutter disc and also that the wear resistant particles will be more intimately surrounded by the cast metal.

In Figs. 1 and 2 the recesses 5 are shown provided with inserts 10 which line these portions of the recesses in which it is desired to provide wear resistant surfaces upon the teeth cast therein. One of such inserts is shown in Fig. 3 as comprising a carrier 11 of consumable material as paper or cloth or any other suitable material adapted to be consumed by contact therewith of molten metal and yet being of such composition that no deleterious contamination of the cast metal will result.

Areal portions of the carrier 11 of the shape of the hard surfaced areas desired are coated with a cementitious material, as for example sodium silicate, and hard particles 12 are placed upon these cement covered areas. After the cement has dried the particles on the uncoated areas are readily removed therefrom. It is to be noted that by means of the steps just set forth it is possible to obtain the desired distribution of particles over an area. Such distribution may also be varied in different portions of such area. It is also possible to position the hard particles only within the area in which a wear resistant surface is desired. For example when casting a toothed cutter disc as illustrated the hard surfacing does not extend to the base of the teeth as indicated at 13 in Fig. 4 and accordingly the central portion 14 of the insert 10 is not coated with adhesive. In a similar manner the juncture of the sides of the teeth as shown at 15 in Fig. 4 is free from the abrasion resisting particles and hence the width of the insert 10 is such that the edges thereof lie adjacent the ridges 16 in the mold 1.

The inserts 10 may be of such configuration as to be mechanically supported in place within the grooves 5 by mere insertion therein. It is preferable, however, that the proper positioning be assured by the use of a suitable cement which is placed upon the inner surface of the mold preliminary to the positioning and attaching of the inserts 10 therein.

A mold prepared in the manner just described is filled with molten metal thru the riser 6. When the molten metal comes in contact with the carrier 10 the initial contact is sufficient to hold the particles 12 in their predetermined positions. Immediately combustion of the carrier 11 is initiated and such combustion creates a void into which the molten metal flows thereby intimately surrounding each of the particles 12. In this manner there results a relatively smooth surface as indicated at 17, the hard particles 12 being completely embedded in such surface but instrumental upon the use of the resulting article in providing the desired abrasion resistant surface.

As already indicated, it is also highly desirable that the mold 1 be rapidly rotated during the casting operation so that the metal in the teeth of the cutter disc will be more dense and also the matrix metal will more intimately surround the individual particles 12.

In Fig. 5 there is shown a carrier which comprises a single strip of combustible material 18 having thereon a plurality of areas 19 to which abrasion resistant particles 12 are affixed in a manner already described in connection with Fig. 3. This type of carrier is particularly convenient in that it facilitates the positioning of the carrier within the respective tooth forming grooves 5 in the mold. Furthermore it is possible with this type of carrier to rely mainly, if not entirely, upon inherent stiffness thereof in holding the carrier in place within the mold.

While the foregoing description is directed to the fabrication of cutter discs it is to be understood that the invention is not confined to the construction of such article but may be utilized for any of various articles upon which abrasion resistant surfaces are desired.

Broadly the invention comprehends a simple and effective method of embedding abrasion resistant particles in the surface of an article to be subjected to abrasion.

What is claimed is:

1. The method of producing an article having abrasion resistant surfaces thereon comprising the steps of, positioning against the surface of the mold a combustible carrier made up of a rigid material having attached thereto on the exposed face hard particles adapted to resist abrasion, and then pouring molten metal into the mold and against said particles to embed the particles in the metal which is to form such article, whereby the particles are held in the positions determined by the carrier and by intimate contact of the molten metal and the particles as the carrier is consumed.

2. The method of producing an article with an abrasion resistant surface, such method comprising the steps of, providing a non-metallic heat consumable carrier in sheet form having abrasion resistant material adhering thereto, adhesively fixing such carrier upon the mold surface with the abrasion resistant material directly exposed to the surface to be cast, and then pouring molten metal into the mold to first contact the abrasion resistant material whereby the molten metal directly encloses the abrasion resistant material as the carrier is consumed.

3. An insert to be positioned in the mold as a unit in the making of cast articles having wear resistant surfaces, comprising a sheet of relatively stiff material which is combustible at the temperature of the molten metal to be cast, one side of said sheet being smooth to be positioned against the mold, comminuted abrasive material in comminuted form affixed to the other side of the sheet so that the sheet presents the abrasive over the area of the article which is to have a face of abrasive resistant material, such insert of material to be positioned in a mold so that the abrasive is first contacted by the molten metal so that the abrasive material will be enclosed by the molten metal and the sheet of material consumed.

FREDERICK M. WITTLINGER.
CHARLES W. SHARTLE, Jr.